Oct. 6, 1931.          R. S. SANFORD          1,825,680
BRAKE OPERATING CONNECTION
Original Filed Aug. 15, 1922
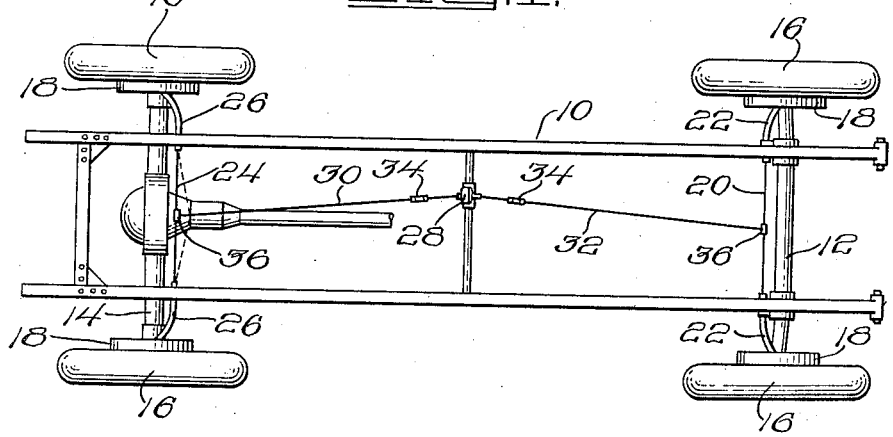
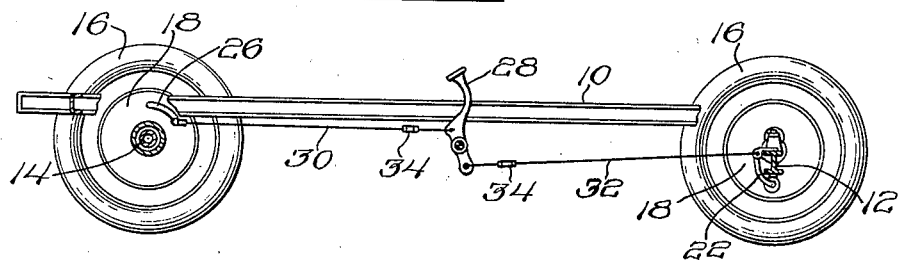
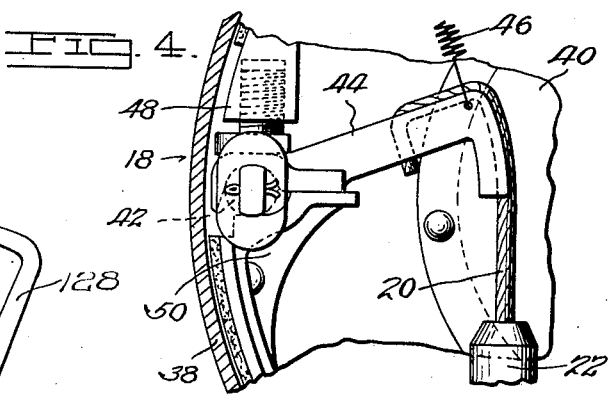
INVENTOR
Roy S. Sanford
BY
M. W. McConkey
ATTORNEY Patented Oct. 6, 1931

1,825,680

UNITED STATES PATENT OFFICE

ROY S. SANFORD, OF SOUTH BEND, INDIANA, ASSIGNOR TO BENDIX BRAKE COMPANY, OF SOUTH BEND, INDIANA, A CORPORATION OF ILLINOIS

BRAKE-OPERATING CONNECTION

Original application filed August 15, 1922, Serial No. 581,945. Divided and this application filed April 16, 1928. Serial No. 270,194.

This invention relates to brakes, and is illustrated as embodied in a novel system of operating connections for a set of four-wheel automobile brakes. Preferably the connections include tension connections such as cables, extending between the two front brakes and between the two rear brakes, and which are both operated by the pedal or an equivalent operating member. Various features of novelty relate to the details of this system of connections, to the adaptation of the system to brakes having floating friction means, and to various other novel and desirable details and constructions which will be apparent from the following description of the illustrative embodiment shown in the accompanying drawings, in which:

Figure 1 is a top plan view of an automobile chassis embodying the invention;

Figure 2 is a diagrammatic longitudinal central section through the chassis, with the frame partly broken away;

Figure 3 is a view, partly in section and partly in side elevation, of a somewhat different pedal construction and Figure 4 is a partial section through one of the brakes, showing the actuating means.

The illustrated chassis includes the usual frame 10 supported by the usual springs (not shown) on a front axle 12 and a rear axle 14. The axles are supported in turn by the usual road wheels 16.

The wheels 16 are provided with brakes 18 of the type fully described in my copending application No. 581,945, filed August 15, 1922, Patent No. 1,668,338 (Reissue No. 17,147) granted May 1, 1928, of which the present application is a division. As fully explained in said Patent No. 1,668,338, each of these brakes includes friction means such as a floating flexible expanding band, with means such as one or more springs for holding it retracted.

As shown in Figure 4, each brake 18 may include a rotatable drum 38 carried by the wheel 16, at the open side of which is a support such as a backing plate 40 carried by the axle or wheel knuckle. The drum and backing plate form a brake chamber or housing within which is arranged the friction means of the brake, shown as a floating band 48 expanded by applying means such as a lever or other floating device 44, and anchoring at one end or the other on an anchor 42. These parts are all more fully described in my above-identified patent.

The bands of the two front brakes are operated by means connected and operated by a flexible tension member such as cable 20 extending along the axle 12. The two ends of cable 20 pass through flexible Bowden-type conduits 22 secured at their inner ends to fittings carried by axle 12 and secured at their outer ends to fittings carried by the brakes; and which in effect form flexible extensions or continuations of the brake chambers or housings. Similarly the two rear brakes are connected and operated by a flexible tension element such as a cable 24 passing at its opposite ends through flexible Bowden-type conduits 26 secured to the chassis frame at their inner ends and to the brakes at their outer ends. The flexible conduits or extensions 22 (and 26) attached to the brakes and housing the ends of the cables 20 compensate for movements of the wheels due to swiveling in steering and due to spring deflections, etc. That is, these movements of the wheels do not substantially affect the brake-applying connections or affect the setting of the brakes.

Both sets of brakes are operated by a member such as a service pedal 28 having flexible tension connections such as cables 30 and 32 leading respectively to the rear and front brakes, and preferably having adjustment means such as turn-buckles 34. In the arrangement of Figures 1 and 2 these connections or cables 30 and 32 are fixedly secured to pedal 28 above and below its fulcrum. In Figure 3, they are replaced by a single cable 130, slidably passing through a tubular tightening device formed on the lower end of pedal 128; in this arrangement the front brakes are equalized against the rear brakes, which is not true in Figures 1 and 2.

The ends of cables 30 and 32 are fixedly but adjustably secured to the cables 24 and 20, approximately at their centers, by fittings 36 frictionally gripping the cables 24 and 20. Fittings 36 can be shifted when desired, to adjust the operating mechanism, but do not shift in the normal operation of the braking system.

While one illustrative embodiment has been described in detail, it is not my intention to limit the scope of the invention to that particular embodiment, or otherwise than by the terms of the appended claims.

I claim:

1. The combination with two of the wheels of a vehicle, of a brake for each of said wheels, a cable connecting the brakes of the respective wheels, a second cable, and means adjustable along the first cable fixedly connecting the second cable thereto.

2. A chassis having a pair of front brakes and a pair of rear brakes, and comprising, in combination therewith, a cable forming a tension Bowden connection between the front brakes, a cable forming a tension Bowden connection between the rear brakes, Bowden conduits enclosing the ends of said cable and secured to the brakes and chassis, an operating device, and connections from said device arranged to operate the two tension connections.

3. A chassis having a pair of front brakes and a pair of rear brakes, and comprising, in combination therewith, a cable forming a Bowden tension member connecting the front brakes, a cable forming a Bowden tension member connecting the rear brakes, an operating device, Bowden conduits enclosing the ends of said cables extending inwardly toward each other and connections from said device fixedly secured to the two cables between the inner ends of the conduits.

4. A chassis having a pair of front brakes and a pair of rear brakes, and comprising, in combination therewith, a cable connecting the front brakes, a cable connecting the rear brakes, an inwardly extending Bowden conduit for each brake, an operating device, and connections slidably engaging the operating device and fixedly secured to the two cables between the ends of the conduits.

5. Braking mechanism for vehicles, having a plurality of pairs of wheels, a brake for each wheel provided with actuating means and manually-controlled power-applying means, comprising unyielding tension members connecting said power-applying means to said brake-actuating means, including a fully floating system of unyielding power-transmitting tension elements applied by the brake lever and connected to all of the respective brake-actuating means to transmit such power unyieldingly to the respective brakes.

6. Braking mechanism for vehicles, having a plurality of pairs of wheels, a brake for each wheel provided with actuating means and manually-controlled power-applying means, a fully floating system of inextensible tension members movably connected to said manually-controlled power-applying means and at the remote ends connected to said respective brake-actuating means and having intermediate unyielding power-transmitting members arranged to transmit the power unyieldingly to the respective brakes.

7. In combination with the frame and wheels of a vehicle, a brake drum carried by each wheel, a friction device mounted adjacent each drum, and means for simultaneously moving the friction devices into braking position including applying means in engagement with each friction device, cables connected to the four applying devices, means for pulling upon the cables, and housings for the portions of the cables adjacent the brakes each comprising a flexible conduit arranged between the wheel and the frame.

8. In combination with the frame and the wheels of a vehicle, a brake drum carried by each wheel, a plate closing the open face of each drum and with the drum forming a brake chamber, a friction device in each brake chamber so formed, and means for simultaneously moving the friction devices into braking position including applying means in engagement with each friction device, cables passing through the plates into the brake chambers and connected to the several applying means, means for pulling upon the cables, and flexible housings for the cables secured to the plates and forming in effect flexible extensions of the brake chambers inclosing the adjacent portions of the cables.

9. In combination with the frame and the wheels of a vehicle, a brake drum carried by each wheel, a plate closing the open face of each drum and with the drum forming a brake chamber, a floating friction device in each brake chamber so formed, and means for simultaneously moving the friction devices into braking position including floating and bodily-shiftable applying means in engagement with each friction device, cables passing through the plates into the brake chambers and connected to the several applying means, means for pulling upon the cables, and flexible housings for the cables secured to the plates and forming in effect flexible extensions of the brake chambers inclosing the adjacent portions of the cables.

10. In combination with the frame and the wheels of a vehicle, a brake drum carried by each wheel, a plate closing the open face of each drum and with the drum forming a brake chamber, a friction device in each brake chamber so formed, and means for simultaneously moving the friction devices into braking position including applying means in engagement with each friction device, a transverse cable connecting the applying means of the two front brakes, another transverse cable connecting the applying means of the two rear brakes, means for pulling on the two cables to tension them to operate the four applying means, and flexible housings for the ends of the cables secured to the plates and forming in effect flexible extensions of the brake chambers inclosing the end portions of the cables.

11. In combination with the frame and the wheels of a vehicle, a brake drum carried by each wheel, a plate closing the open face of each drum and with the drum forming a brake chamber, a friction device in each brake chamber so formed, and means for simultaneously moving the friction devices into braking position including applying means in engagement with each friction device, a transverse cable connecting the applying means of the two front brakes, another transverse cable connecting the applying means of the two rear brakes, means for pulling on the two cables to tension them to operate the four applying means, flexible housings for the ends of the cables secured to the plates and forming in effect flexible extensions of the brake chambers inclosing the end portions of the cables, and means fixedly holding the ends of said housings remote from the plates whereby the housings in effect form Bowden-type conduits for the ends of the cables.

12. In combination with the frame and the wheels of a vehicle, a brake drum carried by each wheel, a plate closing the open face of each drum and with the drum forming a brake chamber, a friction device in each brake chamber so formed, and means for simultaneously moving the friction devices into braking position including applying means in engagement with each friction device, cables passing through the plates into the brake chambers and connected to the several applying means, means for pulling upon the cables, flexible housings for the cables secured to the plates and forming in effect flexible extensions of the brake chambers inclosing the adjacent portions of the cables, and means fixedly holding the ends of said housings remote from the plates whereby the housings in effect form Bowden-type conduits for the ends of the cables.

13. In combination with the frame and the wheels of a vehicle, a brake drum carried by each wheel, a plate closing the open face of each drum and with the drum forming a brake chamber, a friction device in each brake chamber so formed, and means for simultaneously moving the friction devices into braking position including applying means in engagement with each friction device, a transverse cable connecting the applying means of the two rear brakes, a transverse cable connecting the applying means of the two front brakes, an operating lever connected to intermediate portions of the two transverse cables, and flexible housings for the ends of the cables secured to the plates and forming in effect flexible extensions of the brake chambers inclosing the end portions of the cables.

14. A vehicle having four wheels, a drum and a backing plate and a flexible conduit at each wheel arranged to form a brake chamber between the drum and backing plate and with the conduit forming a flexible extension of said chamber, a brake inside each chamber so formed, an operating member, and connections from said member including tension elements extending through the four flexible extensions and connected to the four brakes inside the brake chambers.

15. A vehicle having four wheels and four brakes associated respectively with the four wheels, each brake forming a unit with a flexible extension therefrom, and operating mechanism including a system of flexible tension elements extending at their ends through said extensions and connected with the four brakes.

16. A vehicle having four wheels and four brakes associated respectively with the four wheels, each brake forming a completely housed unit having an applying device within the unit and having a conduit forming an extension of the unit, an operating member, and means connecting said member with the four applying devices and including tension elements passing through said conduits.

17. A vehicle having two front wheels and two rear road wheels with four friction brakes associated respectively with the wheels, flexible transverse tension elements connecting respectively the right and left front brakes and the right and left rear brakes, an operating member connected to said elements and arranged to apply all four brakes, and means associated with the opposite ends of the front tension element and permitting movements of the front wheels with respect to other parts of the vehicle without substantial lengthwise movement of the front tension element.

18. A vehicle having two wheels with associated friction brakes, a flexible transverse tension element connecting said brakes, an operating member connected to said tension element and arranged to apply said brakes, and means associated with the opposite ends of the tension element and permitting movements of the wheels with respect to other parts of the vehicle without substantial lengthwise movement of the tension element.

In testimony whereof, I have hereunto signed my name.

ROY S. SANFORD.